W. H. SQUIRE AND H. A. MERCIÉ.
AUTOMATIC FIREARM.
APPLICATION FILED DEC. 10, 1917.
1,317,633.
Patented Sept. 30, 1919.
17 SHEETS—SHEET 2.
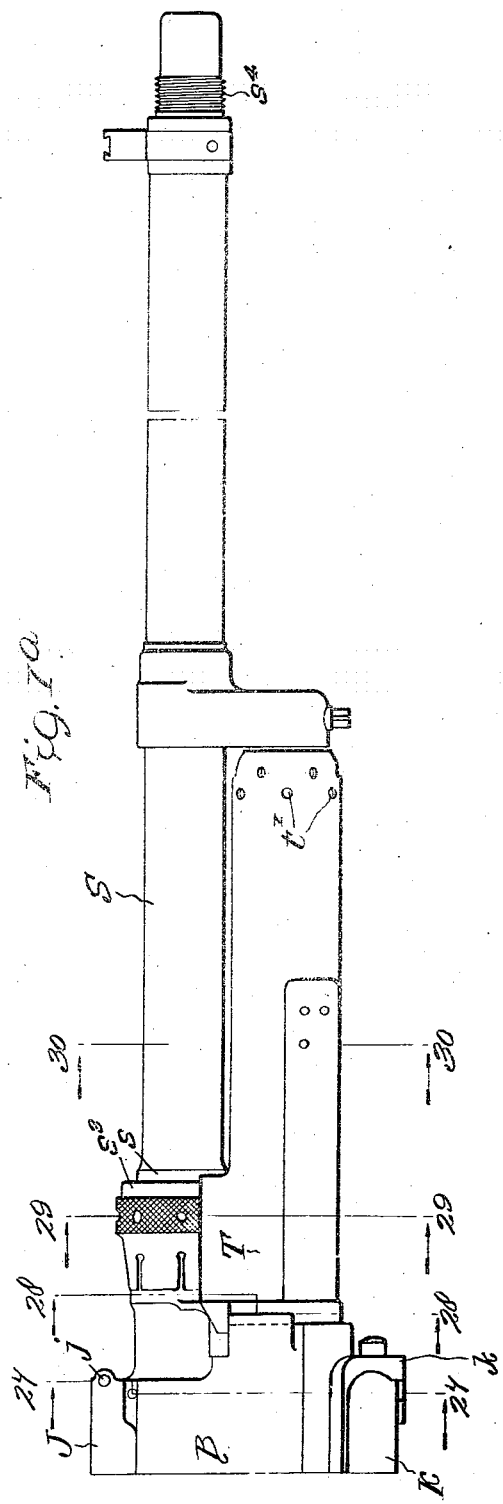
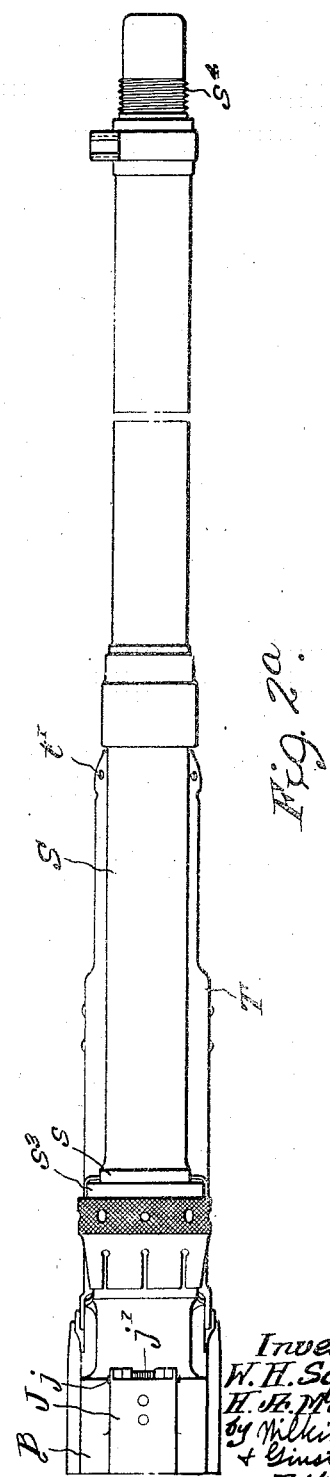
Inventors.
W. H. Squire
H. A. Mercié.
by Wilkinson
& Ginsta,
Attorneys.

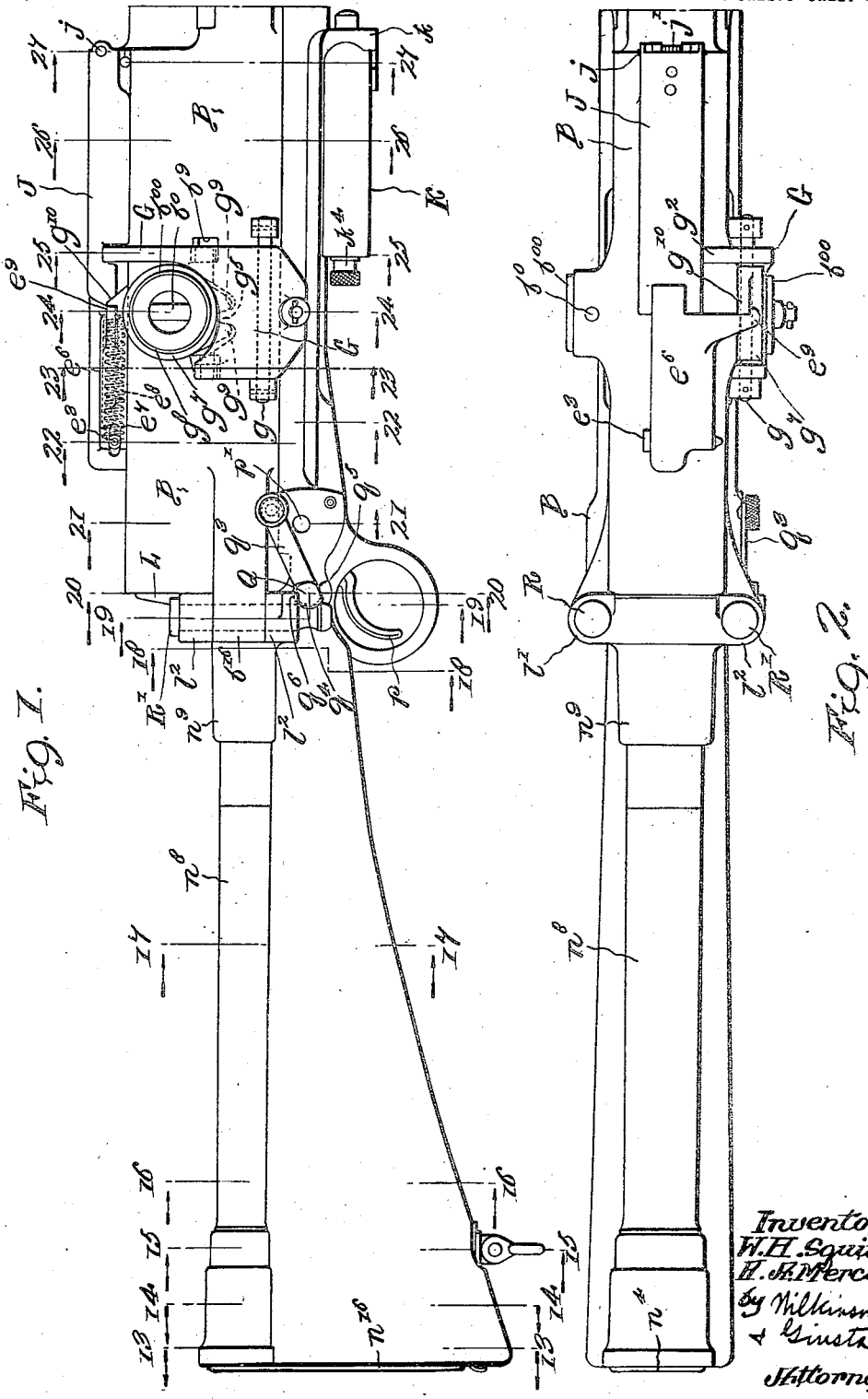

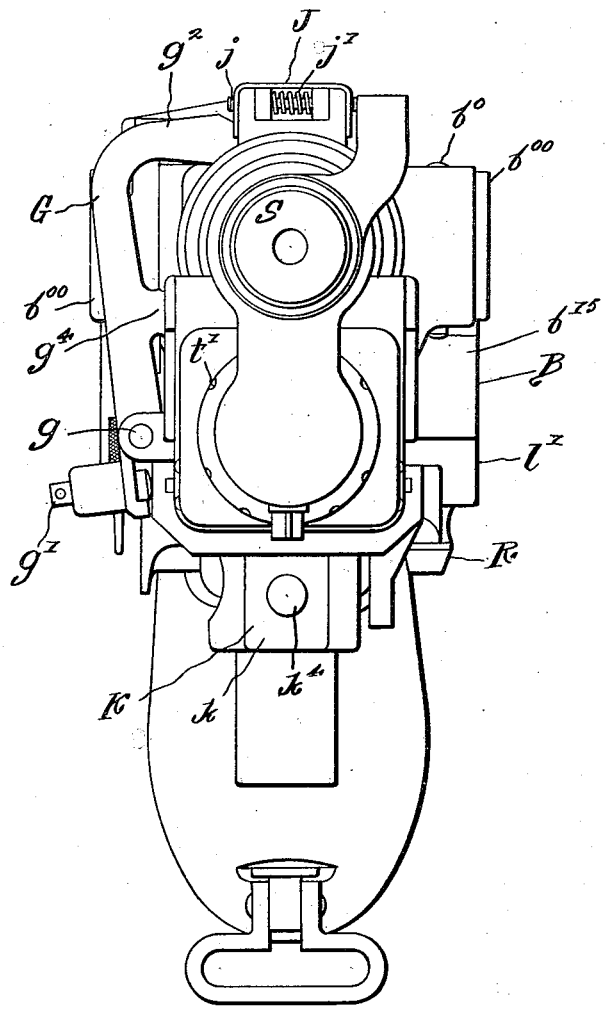

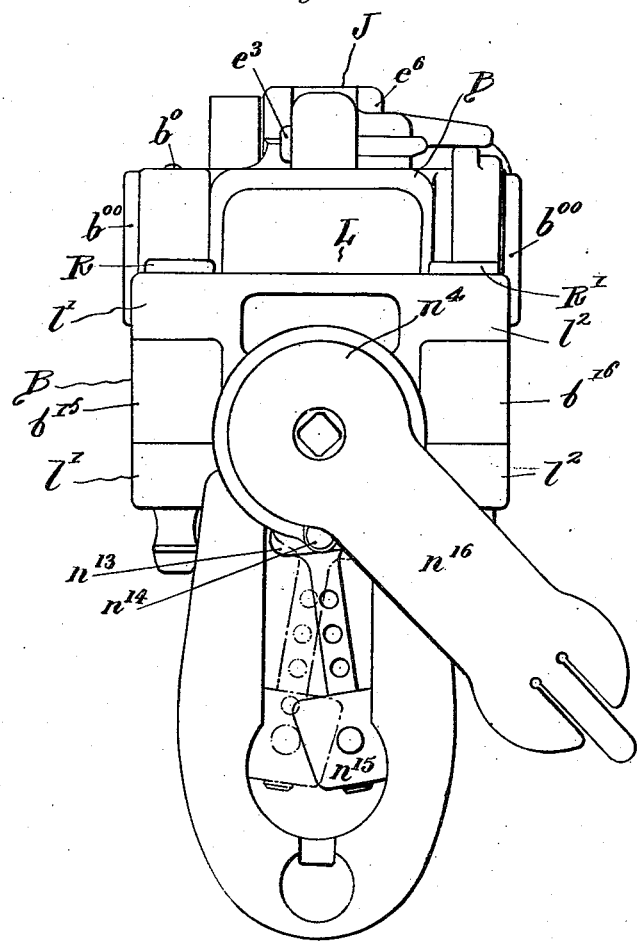

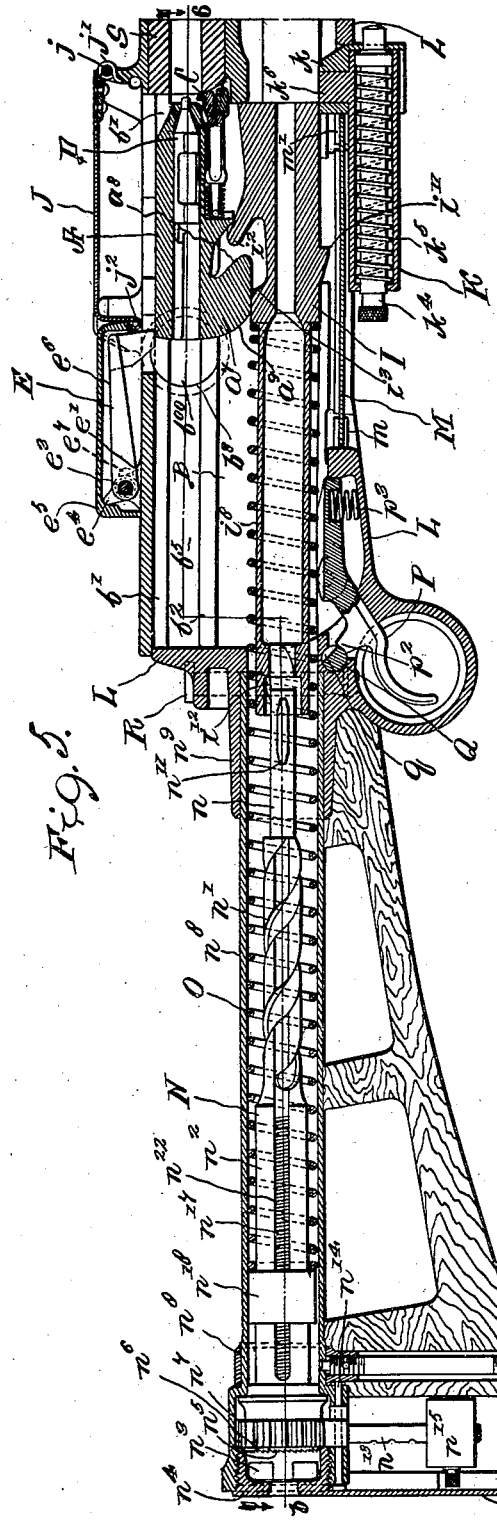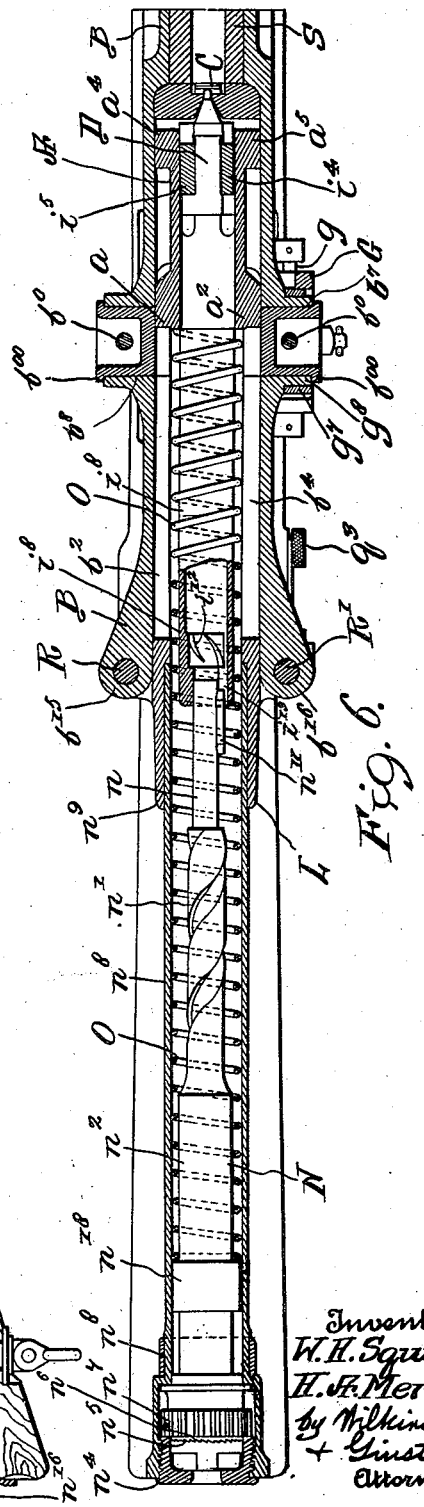

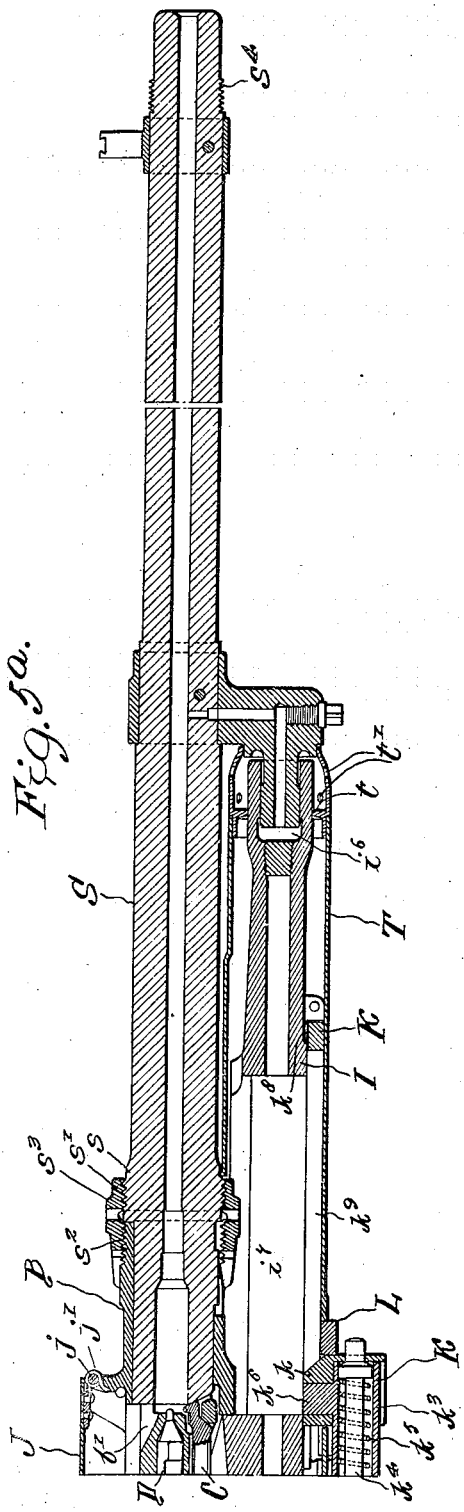
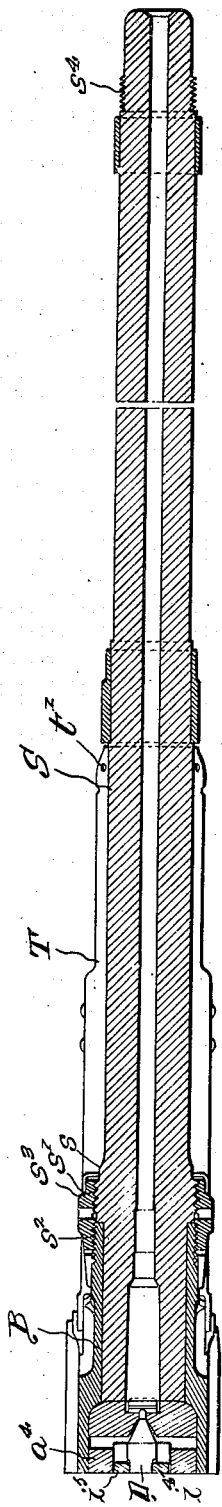

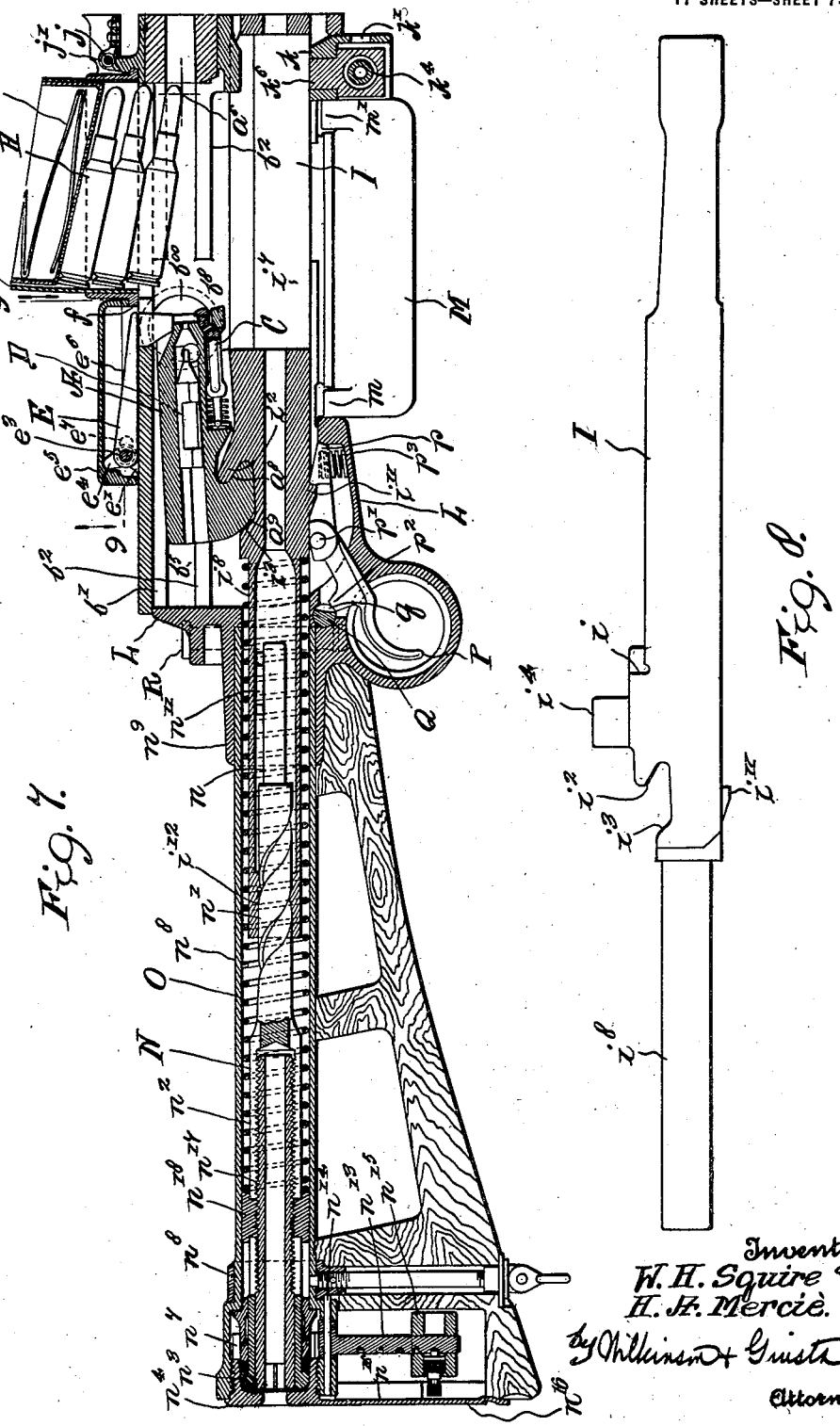

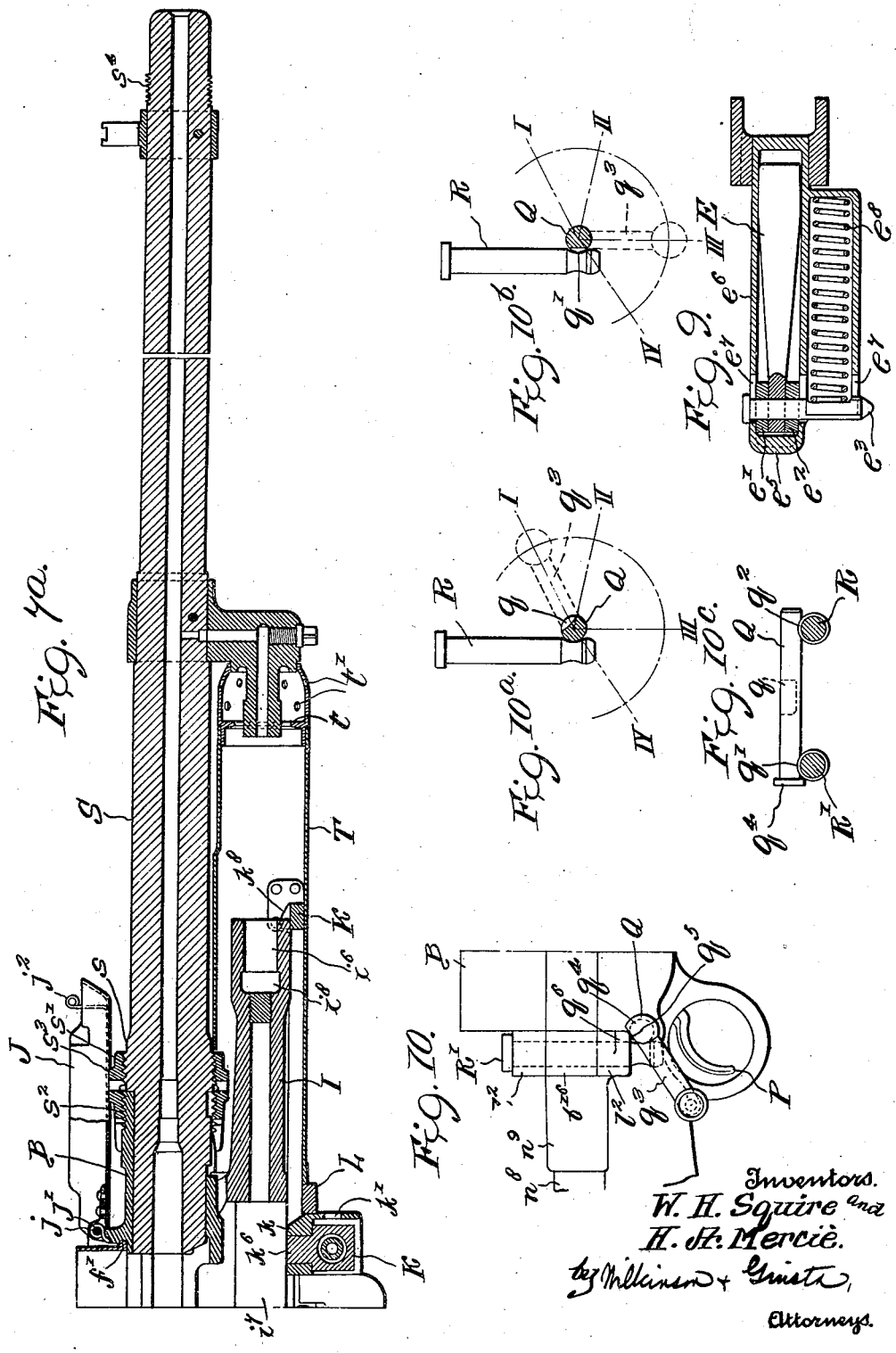

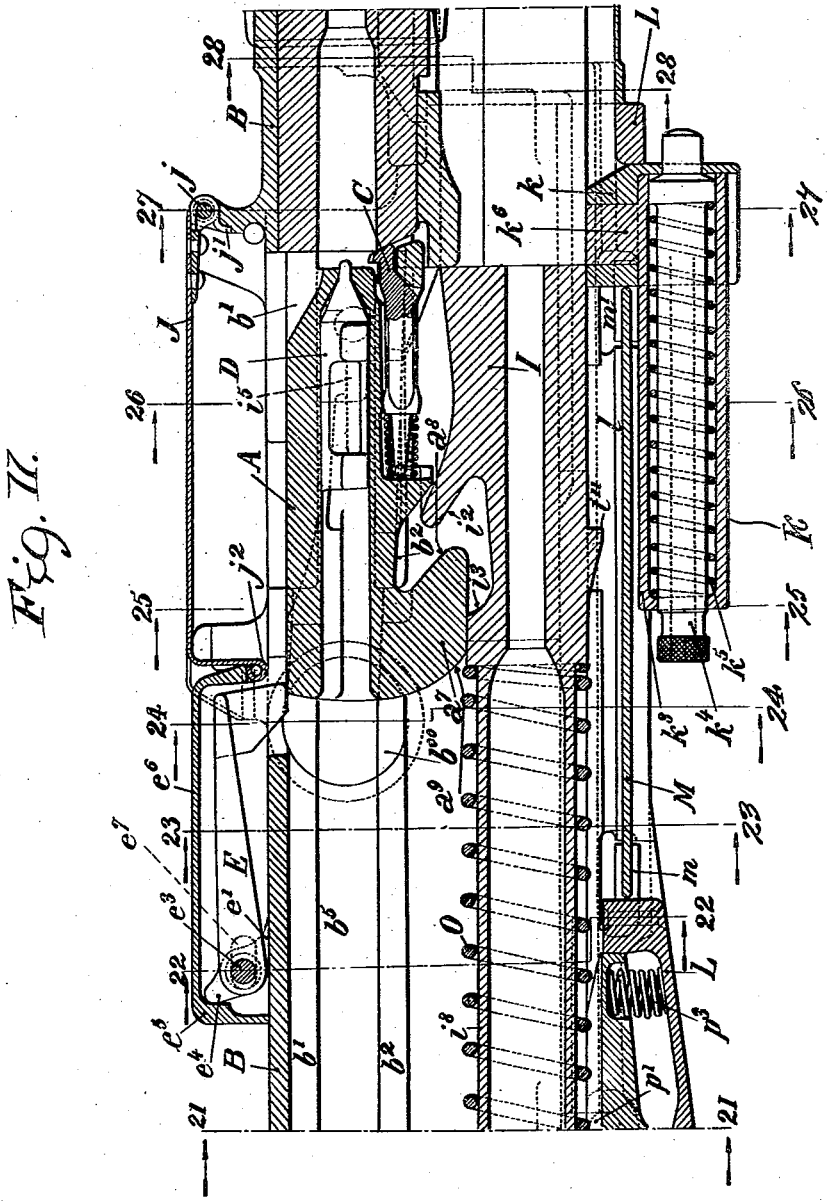

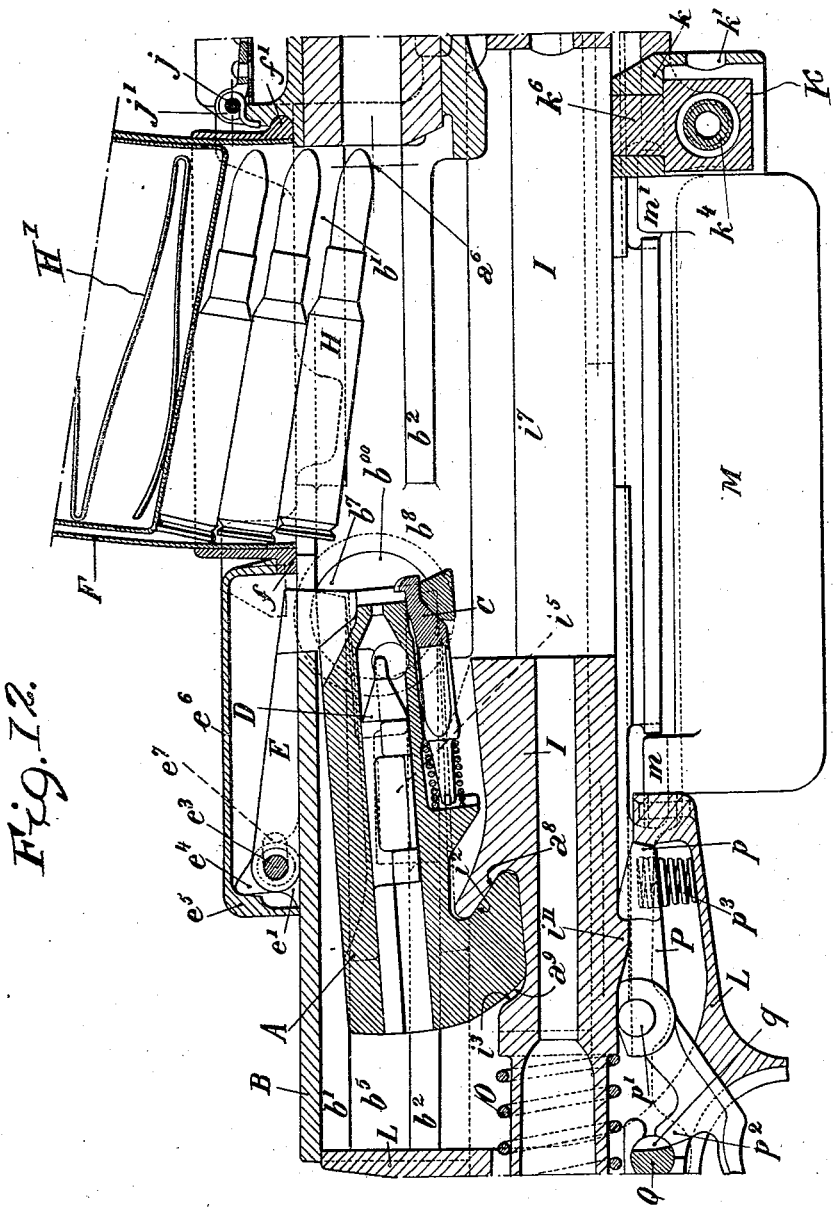

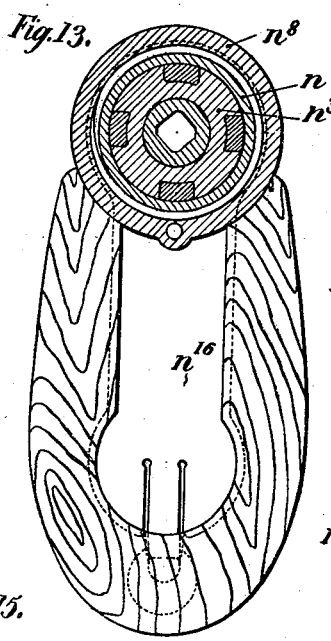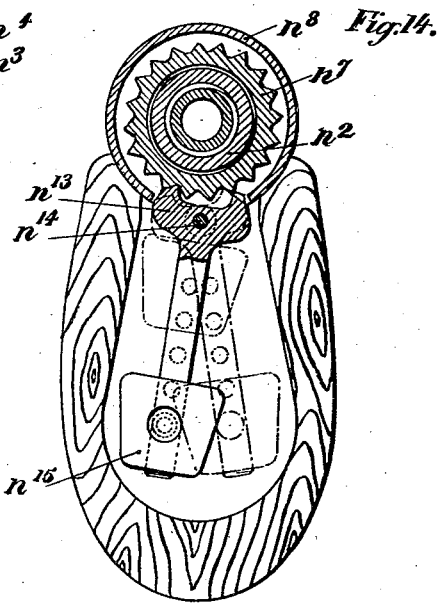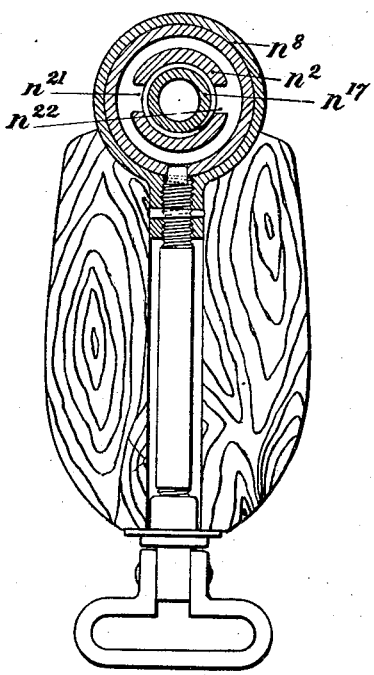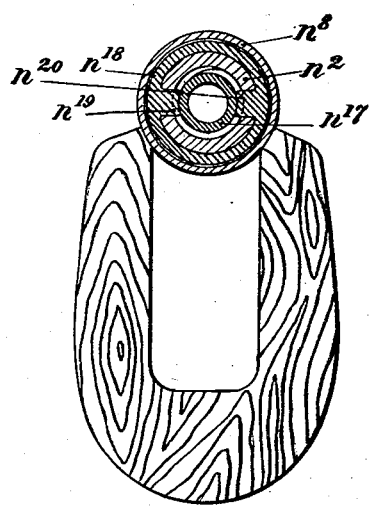

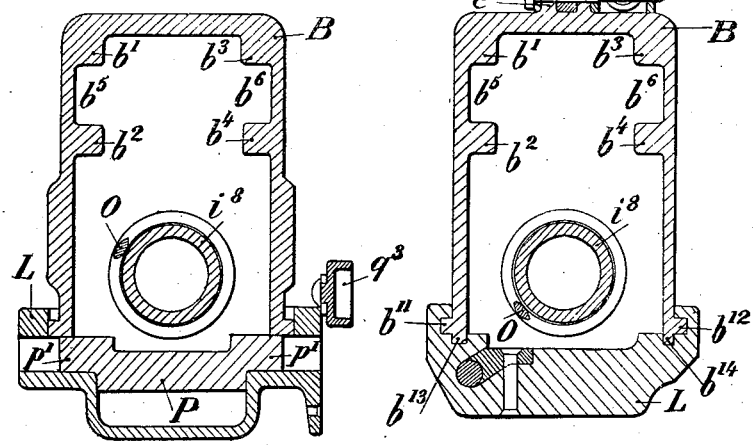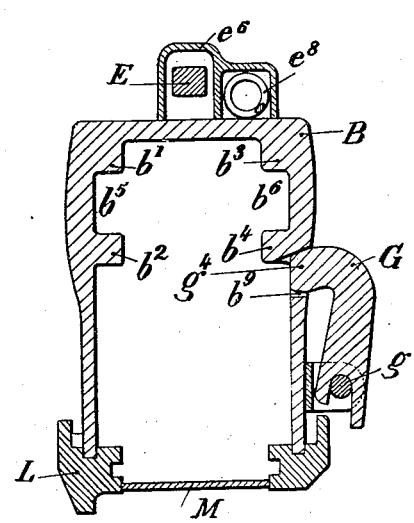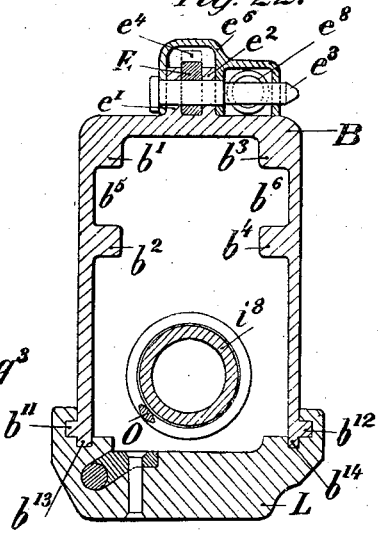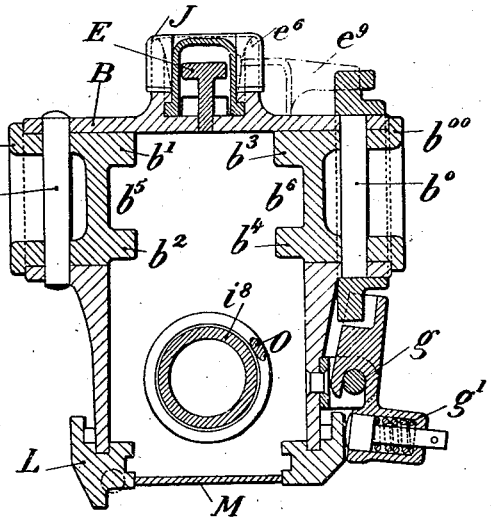

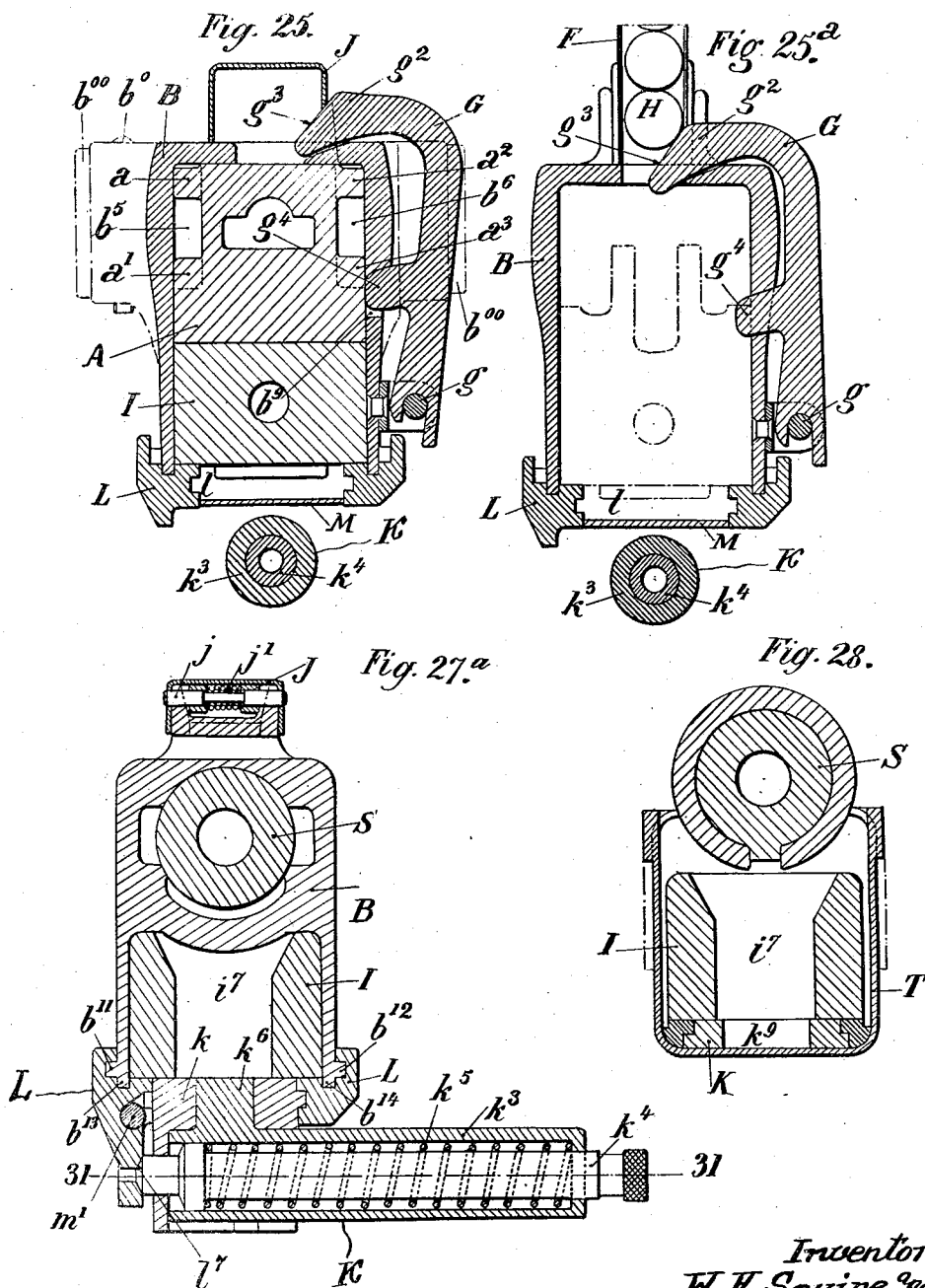

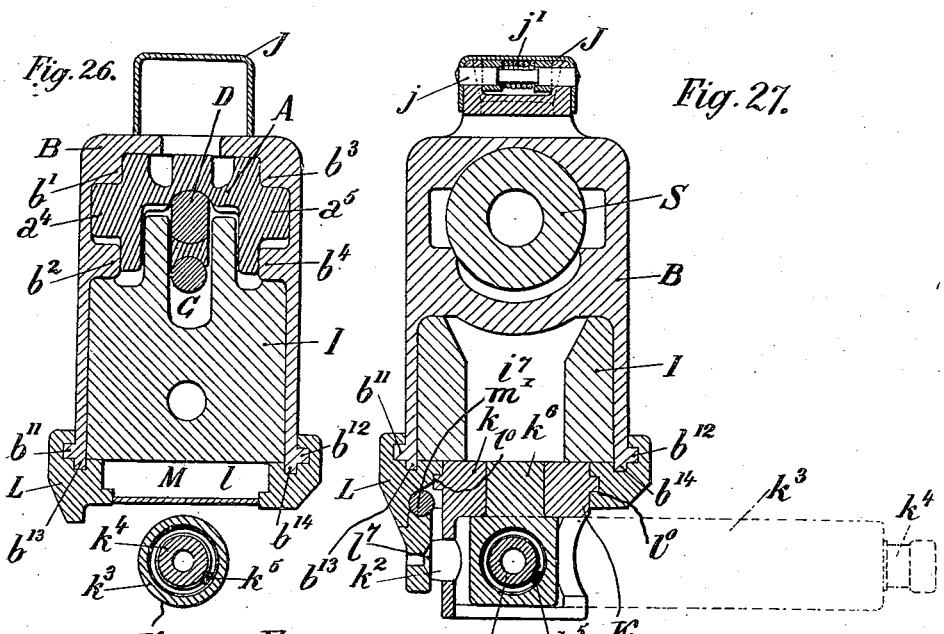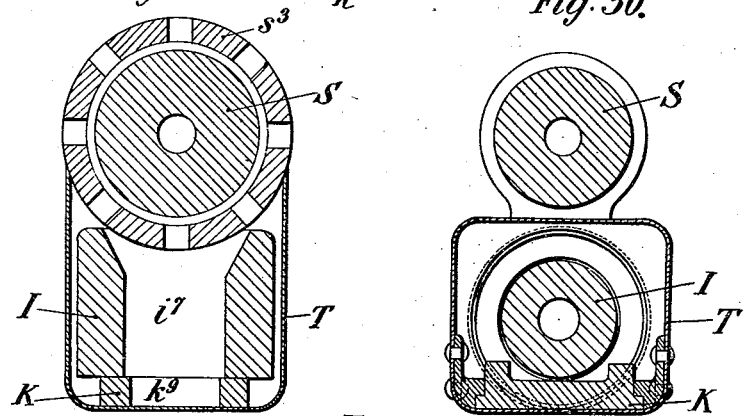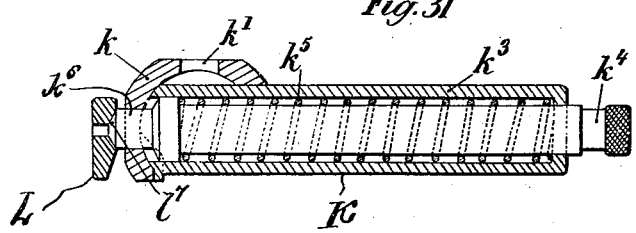

W. H. SQUIRE AND H. A. MERCIÉ.
AUTOMATIC FIREARM.
APPLICATION FILED DEC. 10, 1917.
1,317,633.
Patented Sept. 30, 1919.
17 SHEETS—SHEET 16.
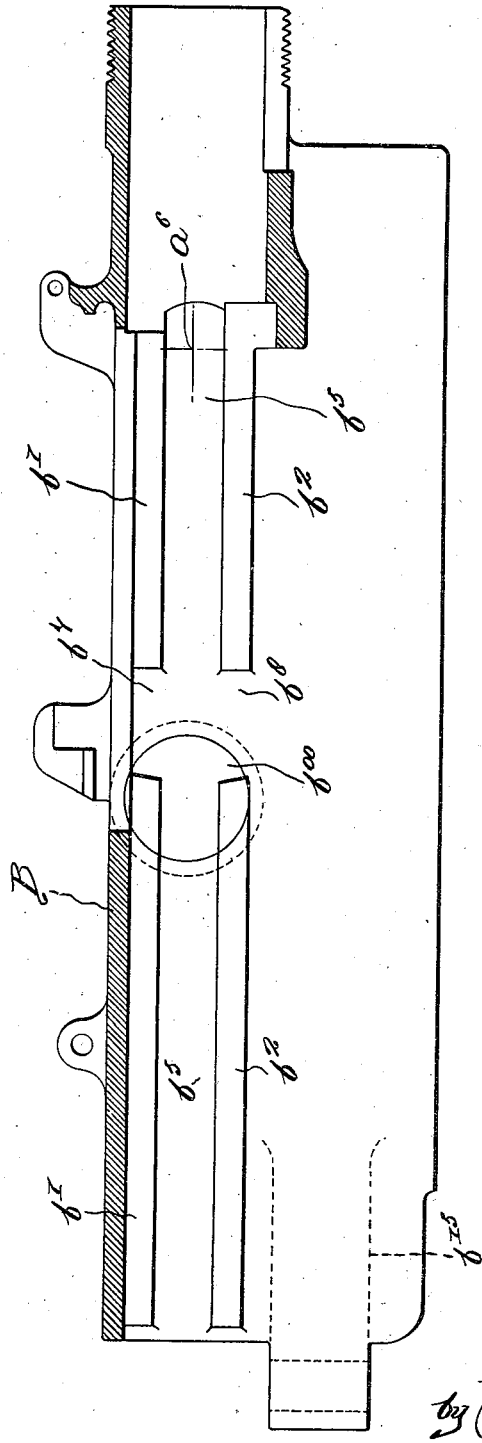
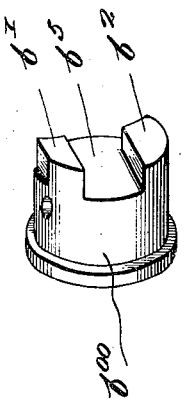
Inventors.
W. H. Squire and
H. A. Mercié.
by Wilkinson & Giusta,
Attorneys.

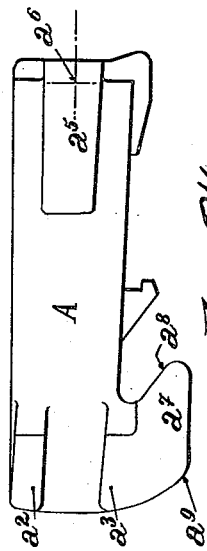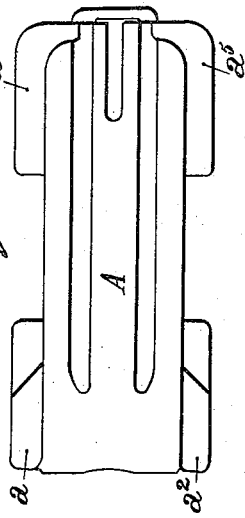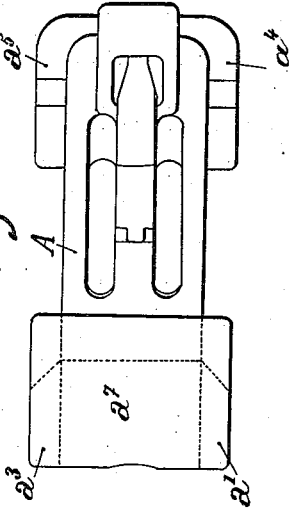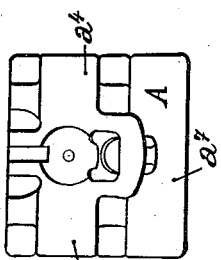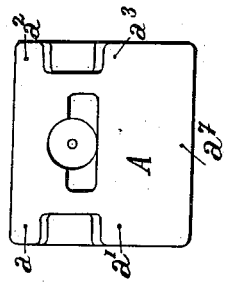

UNITED STATES PATENT OFFICE.

WILLIAM HORACE SQUIRE AND HENRI ALBERT MERCIÉ, OF ST. DENIS, FRANCE, ASSIGNORS TO SOCIÉTÉ ANONYME DES ANCIENS ETABLISSEMENTS HOTCHKISS & CIE., OF ST. DENIS, FRANCE.

AUTOMATIC FIREARM.

1,317,633.      Specification of Letters Patent.      Patented Sept. 30, 1919.

Application filed December 10, 1917. Serial No. 206,502.

*To all whom it may concern:*

Be it known that we, WILLIAM HORACE SQUIRE, a citizen of the United States, and a resident of St. Denis, Seine, France, and HENRI ALBERT MERCIÉ, a citizen of the French Republic, and a resident of St. Denis, Seine, France, have invented certain new and useful Improvements in Automatic Firearms, and I do hereby declare the following to be a full, clear, and exact description of the invention, such as will enable others skilled in the art to which it appertains to make and use the same.

The present invention relates to an automatic firearm, more especially intended to be fired from a support, while still retaining its character of being portable, considering its relatively small weight as compared with machine guns. In other words, this firearm is an intermediary between a rifle and a machine gun, and it belongs to that class of firearms which are operated by the powder gases.

The main features of this firearm relate more particularly to the breech block; to the ejection; to means for operating the piston stop; to the cocking lever; to the firing speed controller or regulator; to means for regulating the tension of the recoil spring; to means for locking the magazine; to means for assembling the shoulder piece with the receiver; to a special arrangement of the closing gates which protect the inside of the firearm against dust during transport; to means for assembling the barrel with the firearm; and, finally, to means whereby any residual gases arising from the piston are prevented from finding their way into the mechanism of the firearm.

The accompanying drawings illustrate a firearm constructed in accordance with the said characteristic features of the invention.

Like parts are indicated by like reference symbols throughout the several views:

Figure 1 shows a side elevation of the rear half of the piece;

Fig. 1ª shows a side elevation of the front half of the piece as seen from the right;

Figs. 2 and 2ª show plan views of the parts shown in Figs. 1 and 1ª;

Fig. 3 shows a front view of the piece as seen from the muzzle;

Fig. 4 shows a rear view of the piece as seen from the breech;

Fig. 5 shows a central vertical section through the rear half of the piece, and shows the breech block in the forward position, and the magazine cover in the closed position;

Figure 17:
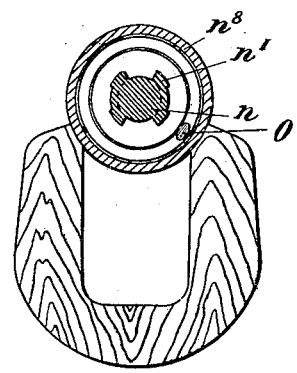
Figure 18:
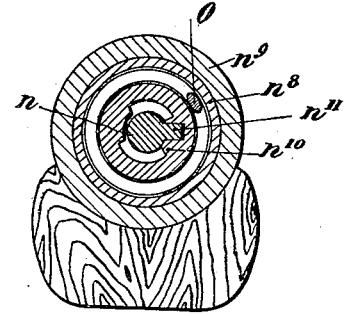
Figure 19:
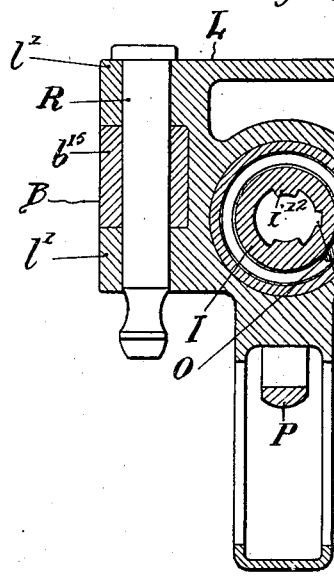
Figure 20:
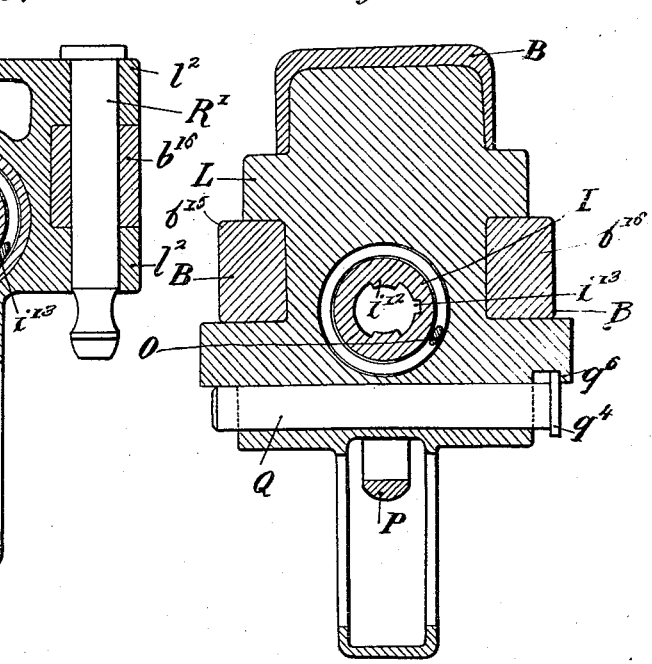

Fig. 5ª shows a similar section through the front half of the piece, and shows the motor piston in its forward position;

Fig. 6 shows a horizontal section partly through the axis of the bore of the rear half of the piece and partly through the upper portion of the stock, the section being along the broken line 6—6 of Fig. 5 and parts being shown in elevation;

Fig. 6ª is a similar view of the front half of the piece, the breech block being shown in the forward position in Figs. 6 and 6ª;

Fig. 7 is a similar view to Fig. 5, except that the breech block is in the open position, the magazine is being supplied with cartridges, and the magazine cover is open;

Fig. 7ª is a similar view to Fig. 5ª, but shows the motor piston in the rear position, and the magazine cover open;

Fig. 8 shows a side elevation of the motor piston;

Fig. 9 shows a section through the ejector box, and shows the ejector in plan, the section being along the line 9—9 of Fig. 7, and looking down;

Fig. 10 is a side elevation of the safety lock;

Figs. 10ª, 10ᵇ and 10ᶜ are diagrams showing the details of the safety lock, and of the pins for assembling the shoulder piece with the receiver;

Fig. 11 is a central vertical section on a large scale, showing the breech block in the forward position, and the magazine cover closed, and illustrates other details of the mechanism;

Fig. 12 is a similar view to Fig. 11, except that the breech block is open, and the cartridges are being fed to the loading chamber;

Fig. 13 shows a section along the line 13—13 of Fig. 1;

Fig. 14 is a similar section along the line 14—14 of Fig. 1;

Figs. 15, 16, 17, 18, 19, 20, 21, 22, 23 and 24 are sections along the corresponding lines of Fig. 1;

Figs. 25 and 25ª are sections through the receiver along the line 25—25 of Fig. 1, but with the parts contained therein in different positions;

Fig. 26 shows a section through the receiver along the line 26—26 of Fig. 1;

Figs. 27 and 27ª are sections along the line 27—27 of Fig. 1, but showing the parts in two different positions;

Figs. 28, 29 and 30 are sections along the lines 28—28, 29—29 and 30—30 of Fig. 1ª;

Fig. 31 shows a section along the line 31—31 of Fig. 27ª;

Fig. 32 shows a central vertical section through the receiver, the parts contained therein being omitted;

Fig. 33 is a perspective view showing one of the wear blocks or chocks which are used to decrease the wear on the operating parts.

Fig. 34 is an end view of the breech block;

Fig. 35 shows a side elevation of the same;

Fig. 36 is a rear view of the breech block;

Fig. 37 is a plan view of the same; and

Fig. 38 is an inverted plan view of the breech block.

Referring to the parts briefly in detail, A represents the breech block; B the receiver; C the extractor which is carried by the breech block, and D represents the firing pin mounted in said block. E represents the ejector; F the cartridge magazine; G the piston stop; I the motor piston; J the magazine gate or cover; K the cocking lever; L the shoulder piece, and M the gate to cover the ejection slot. N represents the controller; O the return spring for the motor piston; P the trigger; Q the safety lock; R and R' assembly pins; S the barrel; and T is the guard for the motor piston.

The breech block A, shown in detail in Figs. 34 to 38, and assembled in Figs. 5, 7, 11 and 12, is made of a single piece and is of the well known tilting type, pivoting in a vertical direction; it is formed with four rear ribs $a$, $a^1$, $a^2$, $a^3$ and two forward ribs $a^4$, $a^5$, and with a hook $a^7$ having two cam faces $a^8$ and $a^9$.

Within the receiver B (shown in detail in Fig. 32, and assembled in Figs. 1, 2, 5, 7, 11, 12 and 19-27) are arranged on opposite sides two ribs $b^1$, $b^2$ and $b^3$, $b^4$ leaving grooves $b^5$, $b^6$ between them. In each rib $b^1$, $b^2$, and $b^3$, $b^4$ is provided a break or gap at $b^7$, $b^8$, Figs. 5, 7 and 32, the purpose of which will be made to appear hereinafter. The ideal point around which the breech block A tilts is shown at $a^6$ Figs. 32, 7 and 12, the two extreme positions of the breech block being illustrated in Figs. 5 and 7, and 11 and 12, respectively.

In the position of Figs. 7 and 12, which corresponds to that of the open breech, the upper ribs $a$, $a^2$ are within the grooves $b^5$, $b^6$, (one on each side, Figs. 21 to 24), the upper face of the said ribs bearing against the lower wall of the ribs $b^1$, $b^3$ of the receiver B, while the ribs $a^1$, $a^3$ bear under the ribs $b^2$, $b^4$. On the other hand, in this same position of the breech block, the ribs $a^4$, $a^5$ thereof are within the respective grooves $b^5$, $b^6$, and, in order that this tilting movement of the said block may take place, the ribs $a^4$, $a^5$ are slightly tapered, or narrowed toward the rear, as is illustrated in Fig. 35. In the position illustrated in Fig. 5, which corresponds to that of the closed breech, the ribs $a$, $a^2$ and $a^1$, $a^3$ of the breech block A are substantially in alinement with the ribs $b^1$, $b^3$ and $b^2$, $b^4$ of the receiver B, while the ribs $a^4$, $a^5$ constantly remain in their respective grooves.

This arrangement offers the important advantage that, owing to the symmetry of the bearing points for the breech block by means of the rear face of its ribs $a$, $a^1$, $a^2$, $a^3$ acting against the forward faces of the ribs $b^1$, $b^2$, $b^3$, $b^4$ of the receiver B, the recoil strains are equally distributed on each side of the axis of the breech block, the said axis coinciding with the axis of the barrel.

In practice, the acting bearing surfaces of the ribs $b^1$, $b^2$, $b^3$, $b^4$ may be formed of hardened chocks $b^{00}$, fitted in the receiver B, as illustrated in Figs. 32, 33, and Figs. 1, 5, 6, 7, 11, 12 and 24, the chocks being driven in and held by pins $b^0$ (Figs. 1, 6 and 24). By these means, it is possible, in case of wear and tear, to exchange the engaging surfaces by substituting new chocks $b^{00}$ for old ones. The breech block A is provided, at its lower part, with a projection $a^7$ formed with the usual opening and closing cams $a^8$, $a^9$, respectively.

The extractor C, Figs. 5, 7, 11 and 12, of the Hotchkiss type may be similar to the one described in U. S. Letters Patent to Benét and Mercié, granted October 15, 1912, No. 1,041,410, and entitled Cartridge case extractor.

The firing pin D, arranged within the breech block A, is likewise of the Hotchkiss known type, but it may be of any other system.

The ejector E itself is the usual ejector. The arrangement is such, however, that the mechanism which actuates it serves at the same time to bring about the engagement of the cartridge-magazine with the firearm. On the other hand, this same mechanism coöperates to automatically disengage the said magazine, the moment the last cartridge therein contained has been fired. The ejector E is pivoted on the pin $e^3$ between two lugs $e^1$, $e^2$ (Figs. 5, 9 and 11), formed on the receiver B; it is formed with a cam $e^4$ (Fig. 11) which bears against a wall $e^5$ on a box $e^6$, playing the part of a lock for the magazine, as will be hereinafter described.

At the front, the box $e^6$ slides in grooves formed on the receiver, as is illustrated in Figs. 9 and 24; at the rear, it is guided by the pin $e^3$, which passes through the elongated holes $e^7$ in said box, as illustrated in Figs. 5, 7, 9, 11 and 12. The forward portion of the locking box $e^6$ is notched, as shown in Figs. 7 and 12, to engage the cartridge magazine F, by means of a projection $f$ on the latter. This magazine, which is of the usual known type, contains cartridges H and a spring H' which pushes them successively to the loading position; and the magazine is held in place by a catch $f^1$, Fig. 12. In the inside and at the right-hand side of the locking box $e^6$ is arranged a spring $e^8$ (Figs. 9 and 22 and 23), which bears at one end against the pin $e^3$ and at the other end against the forward and internal wall of the said box.

As is the case with all firearms of this type, the piece according to the present invention is equipped with a piston stop G, the normal function of which is to stop the piston when the breech block is in the open position, the moment the last cartridge of the magazine has been fired. Independently of its construction, which is peculiar, as will be seen hereinafter, the said stop is, furthermore, so combined with the locking box $e^6$ as to actuate the said box, and, consequently, release the magazine, as soon as it is empty. The rifleman only requires then to substitute a loaded magazine for the empty one.

The said stop G, the shape of which is shown in Figs. 1, 2, 3, 23, 24, 25 and 25$^a$, pivots on an axis $g$ fitted to the receiver B. A spring $g^1$ (Fig. 24) tends to push it inwardly into the position as shown in Fig. 25$^a$. A nose $g^2$, formed with an inclined face $g^3$, comes in contact with the first cartridge H of the magazine. A catch $g^4$ (Figs. 3, 23, 25 and 25$^a$) formed on the body of the stop has for its main purpose to hold the piston to the rear, and, consequently, also the breech block the moment the last cartridge has been fired; the said catch has, furthermore, for its function to limit the travel of the stop by striking an abutment $b^9$ on the receiver B, Figs. 1 and 23. When the magazine contains cartridges, the stop G assumes the position shown in Fig. 25, i. e. its outward position, in which a cartridge, owing to its contact with the inclined face $g^3$, pushes away the stop. This movement has for its purpose to release the catch $g^4$, so that the piston I may be free to move to and fro without hindrance, as long as cartridges are contained in the magazine. When, on the contrary, the magazine does not contain any more cartridges (it will be assumed that those illustrated in Fig. 25$^a$ are removed), and the inclined face $g^3$ being no longer arrested by its contact with a cartridge, the stop G, in pivoting around its axis $g$, is pressed inwardly under the action of its spring $g^1$, thereby causing the catch $g^4$ to protrude into the receiver B, so that the piston may, as it returns to "in battery," rest thereagainst, through the intermediary of an abutment $i$, Fig. 8, formed on the said piston.

The stop G is arranged in the following manner; for the purpose of releasing the magazine, when once the same is empty. The stop is adapted to carry out, apart from its rocking movement, on its axis $g$, a longitudinal rectilinear movement along said axis until, in view of the stress exerted by the abutment $i$ on the piston I, it is arrested by the abutment $b^9$, Figs. 1, 23 and 25, formed on the receiver B; it is provided with a projection $g^5$ (Fig. 1) acting to establish its connection with the locking box $e^6$, through the instrumentality of a double lever $g^7$ pivoted to a hub $g^8$, Fig. 6, on the receiver B and the lower arm of which assumes the shape of a fork $g^9$, Fig. 1, into which engages the projection $g^5$; while the upper arm $g^{10}$ of said lever acts against an arm $e^9$ carried by the locking box $e^6$.

If, as has just been explained, the last cartridge has been fired, the stop G has been pushed inwardly (Fig. 25$^a$) and its catch $g^4$ lies in the path of travel of the piston I. As soon as the said catch and the piston come into engagement, the stop is pushed forwardly along its axis until it abuts, at $b^9$, against the receiver B. The result is that, as it carries out its rectilinear movement, the stop causes the double lever $g^7$ to effect an angular movement, whereby the upper arm $g^{10}$ acts upon the arm $e^9$ and thus pushes the locking box $e^6$ backwardly, against the stress of its spring $e^8$, (Figs. 1 and 2). The object of this rearward movement is to free the magazine F by releasing the projection $f$ (Figs. 7 and 12) from the notch formed on the said locking box.

The introduction of another magazine effects a reverse action from that hereinbefore described, in that the first cartridge H, Fig. 25$^a$, acting upon the inclined face $g^3$ of the stop G, pushes the latter back into the position illustrated in Fig. 25, releases the catch $g^4$ and frees the piston I, while at the same time, owing to its spring $e^8$, the locking box $e^6$ reëngages the projection $f$ on the maginzine F, Figs. 7 and 12.

The firearm is provided with a gate J for closing the aperture for the magazine during transport. This gate can be closed by hand. It swings open automatically as the breech is being opened, but it may also be opened by hand. The said gate J, pivoted on an axis $j$, tends to remain open, in the position of Fig. 7$^a$, by means of a torsional spring $j^1$, and it is provided with a catch $j^2$, Figs. 5 and 7$^a$, which, answering the same purpose as the projection $f$ on the magazine F, engages under the locking box $e^6$. From the foregoing it will be readily understood that the gate is automatically unlocked in the same way as the magazine.

The firearm is equipped with a cocking lever K, the handle of which protrudes at the side, as usual, for operating the mechanism by hand, but which may be turned down under the firearm, for transport. The lever, according to the present invention, is of special construction and serves, furthermore, for keeping the gate of the objection slot closed. The said lever K is formed of a slide carrying a socket $k$ having two holes $k^1$, $k^2$ (Figs. 31 and 27), and of a handle $k^3$ inclosing a bolt $k^4$, acted on by a spring $k^5$. The said handle is provided with a pivot $k^6$ mounted in the slide of the cocking lever K, the latter moving in grooves $l^o$ formed on the shoulder piece L, see Fig. 27.

For transport, the cocking lever assumes the position illustrated in Figs. 1 and 5, wherein it is out of the way under the firearm. When it is desired to pass from this position to the firing position, a pull is exerted on the bolt $k^4$, after which it is swung around 90 degrees, so as to cause its extremity to engage the hole $k^2$ of the socket $k$, Figs. 27 and 27$^a$. The mechanism can then be operated by hand. During firing, the cocking lever is held stationary by a notch $l^7$ into which engages the end of the bolt $k^4$, Figs. 27, 27$^a$ and 31. The connection between the said cocking lever and the piston I is effected in the usual way, say, for instance, by means of a heel $k^8$, Figs. 5$^a$ and 7$^a$.

When the handle $k^3$ is in the firing position (Figs. 27 and 27$^a$), the gate M for the ejection slot, fitted on trunnions $m$, $m^1$ (Figs. 5, 11 and 27$^a$), pivots on the shoulder piece L, and drops down by gravity and hangs open. When, on the contrary, the said handle $k^3$ is in the position for transport (Fig. 1), it serves to keep the gate M closed and, in this closed position, the gate serves to hold the cocking lever in place.

The firearm is equipped with a controller N, $i.$ $e.$ a device the function of which is to lessen or quicken the firing speed at will. The controller according to the present invention is characterized by the fact that it effects this regulation mechanically, by holding back the piston I more or less during the first part of its forward travel. The mechanism of the said controller comprises substantially a retarding member which creates a resistance to the return movement of the piston.

The said controller N is composed of a rod $n$, (Figs. 5 and 7), on which are formed two helicoidal guide surfaces $n^1$, and having a tubular portion $n^2$, the rear end of which is provided with an abutment $n^3$ serving for guiding the rear end of the rod in a bearing $n^4$. The said abutment is formed internally with ratchet teeth $n^5$, Figs. 5 and 6, engaging similar ratchet teeth $n^6$ formed on an escapement wheel $n^7$, the whole being arranged inside a supporting tube $n^8$ fastened in a sleeve $n^9$ carried by the shoulder piece L.

In the rear end of the motor piston I are formed helicoidal guide surfaces $i^{12}$ (Figs. 5 and 6) which correspond to those $n^1$ on the rod $n$ and with which they are intended to coöperate.

In order that the two sets of helicoidal guide surfaces may register accurately with each other, there is formed, on the rod $n$, a guide rib $n^{11}$ which works in a groove $i^{13}$, (Figs. 19 and 20), formed at the rear end of the piston. When the parts are in their extreme forward position, illustrated in Fig. 5, the rib $n^{11}$ operates, as will be hereinafter described, a vibrating member which we will call a "vibrator" $n^{13}$ (Figs. 5, 7 and 14) pivoted on an axis $n^{14}$ and the stem of which carries a counterweight $n^{15}$, which is adjustable, for the purpose of varying, at will, the resistance to be opposed to the rotation of the said wheel $n^7$ and, consequently, of the rod $n$. A flexible arm $n^{16}$, fitted to the bearing $n^4$, constructed in the form of a screw-threaded plug, enables on the one hand the plug to be screwed into place, and, on the other, the housing for the vibrator $n^{13}$ in the butt-stock to be closed, see especially Fig. 4.

The interior of the tubular portion $n^2$ of the rod $n$ receives a screw-threaded rod $n^{17}$ upon which is screwed a nut $n^{18}$. The connection of this nut with its rod is effected by means of two threaded sections $n^{19}$, $n^{20}$, Fig. 16, diametrically opposite each other, passing through slots $n^{21}$, $n^{22}$, Fig. 15, formed on the said tubular portion $n^2$. The purpose of this arrangement is to enable the tension of the return spring O to be adjusted, an operation which is carried out by means of a square wrench introduced into the square hollowed end of the screw-threaded rod $n^{17}$ (Figs. 4 and 7), through the rear of the butt-stock, so as to impart rotary motion to the said rod and, consequently, cause the nut $n^{18}$ to advance or recede.

The operation of the said controller will be readily understood. When the piston I recoils, its helicoidal guide surfaces $i^{12}$ meet the guide surfaces $n^1$ on the rod $n$, the guide rib $n^{11}$ acting to insure proper register, as hereinbefore explained. The moment the said surfaces engage each other, the rod $n$ recedes until its ratchet teeth $n^5$ fully disengage from the ratchet teeth $n^6$ on the escapement wheel $n^7$, thus rendering the said rod loose during the whole of the remainder of the travel of the piston I. On the piston returning to battery, the guide surfaces $i^{12}$, $n^1$ carry the rod $n$ slightly forward, causing the ratchets $n^5$, $n^6$ to reëngage, thereby causing the escapement wheel $n^7$ to be firmly connected to the rod $n$. Owing to the rotary movement imparted by the said guide surfaces, the said rod imparts its movement to the escapement wheel $n^7$, but it cannot revolve freely on account of the resistance offered by the vibrator $n^{13}$ along with its counterweight $n^{15}$.

When the rifleman wishes to put the controller out of action, for instance, for rapid firing, it is sufficient to disengage the vibrator $n^{13}$ from the escapement wheel $n^7$. This disengagement can be effected by any mechanical means consisting, for instance, in removing the vibrator, along with its axis $n^{14}$, and in setting the latter in a hole situated in any other position corresponding to fully throwing out of gear.

The piston I is formed with the usual cams $i^2$, $i^3$ (Fig. 8) for operating the breech block A, in order to bring about the opening and closing of the breech, and with the projections $i^4$, $i^5$, Figs. 6, 8 and 26, for firmly connecting the firing pin D with the piston I. Furthermore, it is formed with the front cup $i^6$ (Fig. 5$^a$) subjected to the action of the powder gases, and toward the middle with slot $i^7$ (Figs. 5$^a$, 7$^a$, 28 and 29) for the passage of the ejected cartridge cases.

In this construction of firearm, the ejection of the cartridge cases takes place downwardly, and to that end the piston I is formed with the slot $i^7$ already referred to herein. Another slot $k^9$ (Figs. 5$^a$, 28 and 29) is formed in the cocking lever K, and a third slot $l$ (Figs. 25 and 26) in the shoulder piece L, the latter slot being closed by the gate M.

The rear end of the piston I terminates in a sleeve $i^8$, which acts to guide the return spring O. In the interior of the end of the said sleeve are formed the helicoidal guide surfaces $i^{12}$ hereinbefore referred to.

The piston I operates the breech block A through the instrumentality of the front cam $i^2$, serving for opening the breech, and of the cam $i^3$ serving for closing the breech (Figs. 5, 7, 11 and 12). The said cams coöperate with the cams $a^8$, $a^9$, respectively, on the said breech block.

Finally, the piston I is provided with its usual shoulder $i^{11}$, which engages the sear $p$ of the trigger P (Figs. 5, 7, 8, 11 and 12).

The firing and safety gear comprises the trigger P with its sear $p$ and its pivots $p^1$ (Figs. 7, 12 and 21), mounted in the shoulder piece L; it comprises, furthermore, an arm $p^2$ (Figs. 5, 7 and 12) which serves to arrest the trigger when it is desired to have the firearm in the position of safety. The trigger is acted upon by a spring $p^3$. The said gear also comprises the safety lock Q lodged in the shoulder piece L, and on which are formed three notches, the first one $q$ of which in the middle (Figs. 5 and 10$^c$) serves for allowing passage for the projection $p^2$ of the trigger P, so as to enable the sear $p$ of the latter to be moved downwardly, while the two others $q^1$, $q^2$ enable the pins R, R$^1$ to be disassembled (Figs. 10, 10$^c$).

The safety lock Q comprises its usual operating lever $q^3$, adapted to be set in either one of two positions corresponding to "Safety" and "Firing". The safety position is illustrated in Figs. 1 and 10$^a$ and 10$^b$. The firing position is illustrated at II in Figs. 10$^a$ and 10$^b$. Furthermore, the lock may occupy two other positions III and IV, hereinafter referred to. The lock is at "safety" when the trigger P is arrested in order to prevent the gun from being fired, and it is in the "firing position" when its notch $q$ allows passage for the trigger projection $p^2$, thus enabling the sear $p$ to move downward. In a third position of the said lock, position III (Fig. 10$^b$), its two notches $q^1$, $q^2$ allow passage for the pins R, R$^1$, thus enabling the latter to be disassembled.

The safety lock Q is held in place, without the use of any pin or screw, by the following means. On the said lock is formed an abutment $q^4$ (Figs. 1, 10, 10$^c$ and 20) recessed at $q^5$ and engaging under a projection $q^6$ formed on the shoulder piece L. When the lock Q is in the firing position or at safety, the shoulder $q^4$ is in engagement with the projection $q^6$ and any displacement thereof sidewise is prevented, while when it occupies the position for disassembling (position IV, Fig. 10), the projection $q^6$ is in front of the recess $q^5$ and the pins R and R$^1$ and the lock Q can be removed.

The assembling of the gun barrel, in accordance with the invention, is effected by a special contrivance. The barrel S engages, by its rear portion, in the receiver B, to which it is keyed in the usual manner; it is formed with a swell $s$ having a screw thread $s^1$ situated in the extension of a screw thread $s^2$ formed on the forward end of the receiver. The two screw threads are different as to pitch. A nut $s^3$ corresponding to these two screw threads enables the barrel to be very rigidly fixed, by means of a wrench, owing to the differential system of the screw threads. It is obvious that the inventors reserve to themselves the faculty of applying this mode of assembling to any construction of firearm other than the firearm herein illustrated.

The assembling of the shoulder piece L to the receiver B is effected, in accordance with a principle already adopted, by a locking means involving the use of pins. The locking means is formed, as is illustrated in Figs. 26 and 27, of two sets of ribs, of which two $b^{11}$, $b^{12}$, placed on the side of the said receiver, engage corresponding grooves of the shoulder piece, while the other two $b^{13}$, $b^{14}$, arranged below, engage other corresponding grooves of the said shoulder piece. The pins which serve for assembling are the pins R $R^1$ already referred to, which pass, respectively, through lugs $b^{15}$, $b^{16}$ on the receiver B and through lugs $l^1$, $l^2$ on the shoulder piece L.

The guard T is of usual construction and is assembled with the firearm by the ordinary means.

The firearm is likewise equipped with a device which has for its function to prevent the residue of the powder gases acting inside the cup $i^6$ of the piston I, Figs. $5^a$ and $7^a$, from reaching the mechanism. In principle, this device is essentially composed of a baffle which intercepts the passage of the gases. By way of an example, this baffle is shown in the drawings as in the form of a crown $t$, applied to the inner wall of the guard and surrounding the head of the piston I. At the forward part of the guard are drilled the usual holes $t^1$ for the escape of the gases.

This firearm being more especially intended for use in firing in a prone position, it will be supported at the front or at any point by a support which may be of any suitable kind. To that effect, the barrel S is formed with screw threads $s^4$ (Fig. $5^a$) upon which the support (not shown) is screwed directly.

The operation is as follows:

Assuming the parts of the firearm to be in the position for transport, the legs of the support folded down against the firearm, the gate J closing the upper opening for the passage of the cartridge magazine F, the handle $k^3$ of the cocking lever K folded down under the receiver B and holding the gate M for the ejection slot closed, and the breech closed; the rifleman grasps the milled portion of the bolt $k^4$, draws it to the rear until its extremity disengages the hole in the socket $k$ and he imparts thereto a quarter of a turn toward the right (Fig. $27^a$) until the said end engages the other hole $k^2$, whereby the gate M is freed and the handle of the cocking lever is made fast, (see Fig. $27^a$, and the dotted lines of Fig. 27.) He grasps the handle and draws it abruptly to the rear, whereby, owing to the connection of the projection $k^8$ (Fig. $7^a$) of the cocking lever K with the piston I, the latter is caused to be moved rearwardly, as well as the whole of the mechanism. During this movement, the firing pin D is first drawn rearwardly, and as soon as the piston cam $i^2$ strikes the cam $a^8$ (Fig. 5) on the breech block A, the breech is opened by the tilting of the latter, the tilting movement taking place around the ideal pivot $a^6$ (Figs. 12 and 32) of the said breech block. The piston then carries along the breech block up to the end of its travel (Fig. 12). The piston guide surfaces $i^{12}$ (Figs. 5 and 7) meet the guide surfaces $n^1$ on the rod $n$ of the controller, and, as soon as they are in engagement, the said rod is moved rearwardly until its ratchet teeth $n^5$ disengage from the ratchet teeth $n^6$ of the escapement wheel $n^7$; whereupon the said rod freely carries out a rotary movement owing to the engagement of the surfaces $i^{12}$ and $n^1$. The return spring O is compressed (Figs. 5 and 7), and the breech block is held in this position of Fig. 7, by means of its rear ribs $a$, $a^2$, $a^1$, $a^3$, engaging the ribs $b^1$, $b^3$, $b^2$, $b^4$, respectively, of the said receiver.

At the beginning of the first phase of the forward movement, that is to say, the return of the piston I, the ratchet teeth $n^5$, $n^6$ reengage by reason of the pressure exerted on the guide surfaces $n^1$ on the rod $n$, by the guide surfaces $n^{10}$ on the piston. From that time, the controller N, having become firmly connected with the piston I, opposes its resistance resulting from the action of the vibrator $n^{13}$ upon the escapement wheel $n^7$, and therefore slackens the speed of the return movement of the piston until, at the outset, the said piston takes a bearing, by its abutment $i$ (Fig. 8), against the catch $g^4$ (Fig. 25) of the stop G, after which the said piston, acting against the said catch, carries the stop along, against the tension of the spring $e^8$ (Fig. 9) of the locking box $e^6$, until the said stop takes a bearing against the abutment $b^9$, of the receiver B.

As the stop G moves, the double lever $g^7$ carries out an angular movement and pushes back, by means of its upper arm $g^{10}$, the arm $e^9$ on the locking box $e^6$, which latter is pushed rearwardly against the action of its spring $e^8$ and thus releases the catch $j^2$ (Fig. 11) on the gate J, which serves for closing the aperture of the cartridge magazine F. The gate at once swings open automatically under the action of its spring $j^1$. The rifleman brings the cocking lever K to its initial position (Figs. 7 and 12) in which it is automatically kept through the instrumentality of its bolt $k^4$ held in the notch $k^7$ (Fig. 27) by the thrust of its spring $k^5$.

When a magazine F is being put in place, the foremost cartridge H meets the inclined face $g^3$ (Fig. $25^a$) on the nose $g^2$ of the stop and pushes the latter back around its pivot $g$ (Fig. 25), whereby the catch $g^4$ is freed from the abutment $i$ on the piston I which, being thus released, is impelled forward until it is arrested by the piston shoulder $i^{11}$ and by the sear $p$ on the trigger P.

At this moment of the operations, a cartridge H being in the position for loading, the weapon is ready to be fired, if the safety lock Q is in the firing position (position II). On pulling the trigger P, the shoulder $i^{11}$ and sear $p$ separate and the piston, being free again, continues its forward movement and introduces a cartridge into the chamber, through the instrumentality of the breech block A, and as soon as the latter reaches its extreme position shown in Fig. 5, the piston I, in causing the said breech block to be tilted, closes the breech by the action of the closing cam $a^9$ coöperating with the piston cam $i^8$. The breech being closed, the piston I continues to carry out its movement, the firing pin D strikes the primer and the shot is fired.

It it to be here observed that, during the hand operation, the controller produces its effects, on the one hand, during the return movement of the piston to battery, until the shoulder $i^{11}$ and sear $p$ engage, and that it momentarily ceases to act and resumes its effects, in part, the moment the piston has again become free by reason of the disengagement of the said shoulder and sear. On the contrary, during automatic firing, the controller acts continuously until the guide surfaces $n^1$, $i^{12}$ separate.

It is to be recalled that the register, that is to say, the alinement of the guide surfaces $n^1$ and $i^{12}$ is insured by the guiding rib $n^{11}$. When the parts occupy the position illustrated in Fig. 7 with the breech block A to the rear, the piston I gears in engagement with the trigger P and a cartridge H is ready to be introduced into the chamber.

On the shot being fired, the gases have acted upon the piston I and the latter has been driven rearwardly, compressing the return spring. As this movement takes place, the piston first carries along the firing pin and then the breech block, the latter carrying along the empty cartridge case through the instrumentality of the extractor C which brings it to the ejector. The ejector protrudes, when pivoting around its axis $e^3$ (and owing to the thrust of the locking box $e^6$ under the action of its spring $e^8$), behind the face of the cartridge case and ejects the latter downwardly through the piston slot $i^7$ and the slot $k^9$ in the cocking lever K. At the same time, a fresh cartridge moves down into the loading position and the controller N engages the piston. If the rifleman continues to pull the trigger P, the piston I again effects its forward movement, more or less quickly according to the retarding action exerted thereon by the controller, and the same operations are repeated until the contents of the magazine F are exhausted.

When the last cartridge has been fired, the nose $g^2$ of the stop G (Fig. 25) no longer meeting with any resistance, the latter pivots on its exis $g$ under the action of the spring $g^1$ (Fig. 24) and thereby allows the catch $g^4$ to again enter the receiver B (Fig. 25$^a$) and to stop the piston I to the rear, in the open position of the breech illustrated in Fig. 7. Under the action of the piston, the stop G is pushed forward and, acting upon the locking box $e^6$, frees the magazine F, as hereinbefore explained. The firearm is then ready to receive another magazine.

For disassembling the gun, first close the breech, place the lever $q^3$ of the safety lock Q in a vertical position with the knob downward (Fig. 10$^b$), remove the pins R, R$^1$ and then the shoulder piece L, take out the return spring O, pull the piston I together with the breech block A to the rear, remove them from the receiver B and separate the breech block. The firing pin D and extractor C are removed in the usual way.

Remove the trigger P and its spring $p^3$ from their housing on the shoulder piece L and withdraw the safety lock Q, after having first moved it into the position III, illustrated in Fig. 10$^b$.

In order to separate the controller N from the shoulder piece L, unscrew the bearing $n^4$, remove the vibrator $n^{13}$, withdraw the rod $n$, the latter carrying along with it the escapement wheel $n^7$ and the nut $n^{18}$. Unscrew the threaded rod $n^{17}$ from its nut $n^{18}$, remove the latter by causing it to slide toward the front of the rod, and also remove the escapement wheel $n^7$.

Then dismount the cocking lever K by causing it to slide in the guide-way of the shoulder piece L. Separate the handle $k^3$ and remove the bolt $k^4$, along with its spring $k^5$.

Remove the gate M from the ejection slot.

Withdraw the stop G (the shoulder piece L being removed) by first causing it to tilt outwardly until its catch $g^4$ clears the receiver B, then remove it from its pivot $g$ by pushing it upwardly. Separate the double lever $g^7$ from the receiver, withdraw the pivot $e^3$ and then the locking box $e^6$, after which withdraw the ejector E.

Unscrew, by means of a wrench, the nut $s^3$ which connects the barrel S to the receiver B, then separate the barrel by pulling it forward, and finally unscrew the said nut from the receiver. Then separate the guard T and unscrew the barrel support.

In order to assemble the parts again, proceed in a reverse order.

It will be obvious that various modifications might be made in the herein described device, and in the construction, combination and operation of the parts which could be used without departing from the spirit of our invention, and we do not mean to limit our invention to such details except as particularly pointed out in the claims.

Having thus described our invention, what we claim and desire to secure by Letters Patent of the United States is:—

1. In an automatic firearm of the character described, the combination with a receiver and a magazine containing cartridges mounted thereon, of a reciprocating motor piston, and means operated thereby for freeing the magazine when the last cartridge has been released therefrom, substantially as described.

2. In an automatic firearm of the character described, the combination with a receiver and a magazine containing cartridges mounted thereon, of a reciprocating motor piston, and a spring impressed piston stop operated thereby for freeing the magazine when the last cartridge has been released therefrom, substantially as described.

3. In an automatic firearm of the character described, the combination with a receiver and a magazine containing cartridges mounted thereon, of a reciprocating motor piston, and a stop movable longitudinally relative to the axis of the piece and pivoted transversely thereto, operated by said motor piston for freeing the magazine when the last cartridge has been released therefrom, substantially as described.

4. In an automatic firearm of the character described, the combination with a receiver and a magazine containing cartridges mounted thereon, of means for detachably connecting said magazine to said receiver, a reciprocating motor piston, and a spring impressed piston stop normally held clear of said piston by one of the cartridges in the magazine, but moving into the path of said piston when the last cartridge leaves the magazine, and means operated by said piston stop upon its engagement with the motor piston for releasing the magazine from the receiver, substantially as described.

5. In an automatic firearm of the character described, the combination with a receiver and a magazine containing cartridges mounted thereon, of means for detachably connecting said magazine to said receiver, a reciprocating motor piston, and a spring impressed piston stop normally held clear of said piston by one of the cartridges in the magazine but moving into the path of said piston when the last cartridge leaves the magazine, and means operated by said piston stop upon its engagement with the motor piston for releasing the magazine from the receiver, said means comprising a spring impressed locking member carried by the receiver and normally locking the magazine to the receiver, and means connecting said piston stop and said locking member for moving said member against the action of its spring, substantially as described.

6. In an automatic firearm of the character described, the combination with a receiver and a magazine containing cartridges mounted thereon, of means for detachably connecting said magazine to said receiver, a reciprocating motor piston, and a spring impressed piston stop pivoted to said receiver and normally held clear of said piston by one of the cartridges in the magazine but moving into the path of said piston when the last cartridge leaves the magazine, the said piston stop also having a limited longitudinal travel when engaged by the motor piston, and means operated by the longitudinal travel of said piston stop upon its engagement with the motor piston for releasing the magazine from the receiver, substantially as described.

7. In an automatic firearm of the character described, the combination with a receiver and a magazine containing cartridges mounted thereon, of means for detachably connecting said magazine to said receiver, a reciprocating motor piston, and a spring impressed piston stop pivoted to said receiver and normally held clear of said piston by one of the cartridges in the magazine but moving into the path of said piston, when the last cartridge leaves the magazine, the said piston stop also having a limited longitudinal travel when engaged by the motor piston, and means operated by said piston stop upon its engagement with the motor piston for releasing the magazine from the receiver, said means comprising a spring impressed locking member carried by the receiver and normally locking the magazine to the receiver, and a lever connecting said piston stop and said locking member for moving said member against the action of its spring during the longitudinal travel of said stop, substantially as described.

8. In an automatic firearm of the character described, the combination with a receiver and a magazine containing cartridges mounted thereon, of a spring impressed locking box detachably connecting said magazine to said receiver, an ejector contained in said box and held in the operative position when said box engages the magazine, a reciprocating motor piston, and a spring impressed piston stop pivoted to said receiver and normally held clear of said piston by one of the cartridges in the magazine but moving into the path of said piston when the last cartridge leaves the magazine, the said piston stop also having a limited longitudinal travel when engaged by the motor piston, and means operated by the longitudinal travel of said piston stop upon its engagement with the motor piston for moving said locking box out of engagement with the magazine, substantially as described.

9. In an automatic firearm of the character described, the combination with a receiver and a magazine containing cartridges mounted thereon, of a spring impressed locking box detachably connecting said magazine to said receiver, an ejector contained in said box and held in the operative position when said box engages the magazine, a reciprocating motor piston, and a spring impressed piston stop pivoted to said receiver and normally held clear of said piston by one of the cartridges in the magazine but moving into the path of said piston when the last cartridge leaves the magazine, the said piston stop also having a limited longitudinal travel when engaged by the motor piston, and a lever connecting said locking box and said piston stop, operated by said piston stop in its longitudinal travel, substantially as described.

10. In an automatic firearm of the character described, the combination with a receiver and a magazine containing cartridges mounted thereon, of a spring impressed locking box detachably connecting said magazine to said receiver, an ejector contained in said box and held in the operative position when said box engages the magazine, a reciprocating motor piston, and a spring impressed piston stop normally held clear of said piston by one of the cartridges in the magazine but moving into the path of said piston when the last cartridge leaves the magazine, and means operated by said piston stop upon its engagement with the motor piston for withdrawing said locking box and thus releasing the magazine from the receiver, substantially as described.

11. In an automatic firearm of the character described, the combination with a receiver and a magazine containing cartridges mounted thereon, of a spring impressed locking member detachably connecting said magazine to said receiver, a reciprocating motor piston, and a spring impressed piston stop normally held clear of said piston by one of the cartridges in the magazine but moving into the path of said piston when the last cartridge leaves the magazine, and means operated by said piston stop upon its engagement with the motor piston for withdrawing said locking member and thereby releasing the magazine from the receiver, substantially as described.

12. In an automatic firearm of the character described, the combination with a receiver and a magazine containing cartridges mounted thereon, of a reciprocating motor piston, a spring impressed piston stop thrown into engagement with said motor piston when the last cartridge has been released from the magazine, and means automatically operated by said stop for releasing the magazine from the receiver, substantially as described.

13. In an automatic firearm of the character described, the combination with a receiver and a magazine containing cartridges mounted thereon, of a reciprocating motor piston, and a spring impressed piston stop movable longitudinally relative to the axis of the piece and pivoted transversely thereto, thrown into engagement with said motor piston when the last cartridge has been released from the magazine, and means automatically operated by said piston stop in its forward travel for releasing the magazine from the receiver, substantially as described.

14. In an automatic firearm of the character described, the combination with a receiver and a magazine containing cartridges mounted thereon, of a reciprocating motor piston, and a spring impressed piston stop movable longitudinally relative to the axis of the piece and pivoted transversely thereto, thrown into engagement with said motor piston when the last cartridge has been released from the magazine, and means automatically operated by said piston stop in its forward travel for releasing the magazine from the receiver, said means comprising a spring impressed locking member carried by the receiver and detachably connecting the magazine to the receiver, and a lever connecting said locking member to said piston stop, substantially as described.

15. In an automatic firearm of the character described, the combination with a receiver and a magazine containing cartridges mounted thereon, of a reciprocating motor piston, and a spring impressed piston stop movable longitudinally relative to the axis of the piece and pivoted transversely thereto, thrown into engagement with said motor piston when the last cartridge has been released from the magazine, and means automatically operated by said piston stop in its forward travel for releasing the magazine from the receiver, said means comprising a spring impressed locking box carried by the receiver and detachably connecting the magazine to the receiver, an ejector mounted in said box and thrown into operative position when said locking box is in engagement with the magazine, and a lever connecting said locking box to said piston stop, substantially as described.

16. In a magazine gun, the combination with a receiver provided with a magazine slot therein, of a hinged cover pivoted at one side of said slot and provided with a latch at its free end, a spring adapted to throw said cover normally to the open position, and a spring impressed locking member mounted on said receiver at the opposite side of said slot and provided with a catch adapted to engage said latch and hold said cover in the closed position when desired, substantially as described.

17. In a magazine gun, the combination with a receiver provided with a magazine slot therein, of a hinged cover pivoted at one side of said slot and provided with a latch at its free end, a spring adapted to throw said cover normally to the open position, and a spring impressed locking box mounted on said receiver at the opposite side of said slot and provided with a catch adapted to engage said latch and hold the said cover in the closed position when desired, with an ejector mounted in said locking box and adapted to project into said receiver, substantially as described.

18. In a magazine gun, the combination with a receiver provided with a magazine slot therein, of a hinged cover pivoted at one side of said slot and provided with a latch at its free end, a spring adapted to throw said cover normally to the open position, and a spring impressed locking member mounted on said receiver at the opposite side of said slot and provided with a catch adapted to engage said latch and hold said cover in the closed position when desired, the said locking member serving also to lock the magazine to the gun when the magazine slot cover is open and the magazine inserted, substantially as described.

19. In a magazine gun, the combination with a receiver provided with a magazine slot therein, of a hinged cover pivoted at one side of said slot and provided with a latch at its free end, a spring adapted to throw said cover normally to the open position, and a spring impressed locking box mounted on said receiver at the opposite side of said slot and provided with a catch adapted to engage said latch and hold the said cover in the closed position when desired, with an ejector mounted in said locking box and adapted to project into said receiver, the said locking box serving also to lock the magazine to the gun when the magazine slot cover is open and the magazine inserted, substantially as described.

20. In a magazine gun, the combination with a receiver provided with a magazine slot therein, of a hinged cover pivoted at one side of said slot and provided with a latch at its free end, a spring adapted to throw said cover normally to the open position, and a spring impressed locking member slidably mounted on said receiver at the opposite side of said slot and provided with a catch adapted to engage said latch and hold said cover in the closed position when desired, substantially as described.

21. In a magazine gun, the combination with a receiver provided with a magazine slot therein, of a hinged cover pivoted at one side of said slot and provided with a latch at its free end, a spring adapted to throw said cover normally to the open position, and a spring impressed locking box slidably mounted on said receiver at the opposite side of said slot and provided with a catch adapted to engage said latch and hold the said cover in the closed position when desired, with an ejector mounted in said locking box and adapted to project into said receiver, substantially as described.

22. In a magazine gun, the combination with a receiver provided with a magazine slot therein, of a hinged cover pivoted at one side of said slot and provided with a latch at its free end, a spring adapted to throw said cover normally to the open position, and a spring impressed locking member slidably mounted on said receiver at the opposite side of said slot and provided with a catch adapted to engage said latch and hold said cover in the closed position when desired, the said locking member serving also to lock the magazine to the gun when the magazine slot cover is open and the magazine inserted, substantially as described.

23. In a gas operated automatic gun, the combination with a receiver, and a reciprocating motor piston mounted therein, of a cocking piece slidably mounted in said receiver and provided with a lug adapted to engage the said motor piston, the bottom of said receiver being provided with an ejection slot, and the said motor piston and cocking piece being slotted to register with said ejection slot to permit the ejection of the empty cartridge case, a gate hinged to the bottom of the receiver and adapted to close said slot, when in the raised position, a handle carried by said cocking piece, and means for setting said handle at right angles to said cocking piece when it is desired to operate the gun, or parallel thereto beneath said gate, thereby holding the said gate in the closed position, substantially as described.

24. In a gas operated automatic gun, the combination with a receiver, and a reciprocating motor piston mounted therein, of a cocking piece slidably mounted in said receiver and provided with a lug adapted to engage the said motor piston, the bottom of said receiver being provided with an ejection slot, and the said motor piston and cocking piece being slotted to register with said ejection slot to permit the ejection of the empty cartridge case, a gate hinged to the bottom of the receiver and adapted to close said slot and also to lock said cocking piece against longitudinal movement, when in the raised position, a handle carried by said cocking piece, and means for setting said handle at right angles to said cocking piece when it is desired to operate the gun, or parallel thereto beneath said gate, thereby holding the said gate in the closed position, substantially as described.

25. In a gas operated automatic gun, the combination with a receiver, and a reciprocating motor piston mounted therein, of a cocking piece slidably mounted in said receiver and provided with a lug adapted to engage the said motor piston, the bottom of said receiver being provided with an ejection slot, and the said motor piston and cocking piece being slotted to register with said ejection slot to permit the ejection of the empty cartridge case, a gate hinged to the bottom of the receiver and adapted to close said slot, when in the raised position, a handle carried by said cocking piece, and means for setting said handle at right angles to said cocking piece when it is desired to operate the gun, or parallel thereto beneath said gate, thereby holding the said gate in the closed position, said means comprising a socket piece carried by said cocking piece and provided with a pair of sockets at right angles to each other, and a spring plunger carried by said handle and adapted to snap into either one of said sockets as may be desired, substantially as described.

26. In a gas operated automatic gun, the combination with a receiver, and a reciprocating motor piston mounted therein, of a cocking piece slidably mounted in said receiver and provided with a lug adapted to engage the said motor piston, the bottom of said receiver being provided with an ejection slot, and the said motor piston and cocking piece being slotted to register with said ejection slot to permit the ejection of the empty cartridge case, a gate hinged to the bottom of the receiver and adapted to close said slot and also to lock said cocking piece against longitudinal movement, when in the raised position, a handle carried by said cocking piece, and means for setting said handle at right angles to said cocking piece when it is desired to operate the gun, or parallel thereto beneath said gate, thereby holding the said gate in the closed position, said means comprising a socket piece carried by said cocking piece and provided with a pair of sockets at right angles to each other, and a spring plunger carried by said handle and adapted to snap into either one of said sockets as may be desired, substantially as described.

27. In an automatic firearm, the combination with a main spring and a reciprocating motor piston, of means operable on the forward movement of said piston for imposing a resistance to the movement of said piston whereby its speed may be decreased, said means comprising cam grooves on the interior of the rear end of said motor piston, a rod having ribs engaging said cam grooves as said piston recoils, means for permitting the free rotation of said rod on the rearward travel of said piston, but for retarding the revolution of said rod on the return movement of said piston, substantially as described.

28. In an automatic firearm, the combination with a main spring and a reciprocating motor piston, of means operable on the forward movement of said piston for imposing a resistance to the movement of said piston whereby its speed may be decreased, said means comprising cam grooves on the interior of the rear end of said motor piston, a rod having ribs engaging said cam grooves as said piston recoils, means for permitting the free rotation of said rod on the rearward travel of said piston, but for retarding the revolution of said rod on the return movement of said piston, said last mentioned means comprising a vibrating arm with a weight carried thereby, and means for gearing said arm to said rod as the motor piston is propelled forward by the main spring, substantially as described.

29. In an automatic firearm, the combination with a main spring and a reciprocating motor piston, of means operable on the forward movement of said piston for imposing a resistance to the movement of said piston whereby its speed may be decreased, said means comprising cam grooves on the interior of the rear end of said motor piston, a rod having ribs engaging said cam grooves as said piston recoils, means for permitting the free rotation of said rod on the rearward travel of said piston, but for retarding the revolution of said rod on the return movement of said piston, said last mentioned means comprising a vibrating arm with a weight carried thereby and adjustably mounted thereon, and means for gearing said arm to said rod as the motor piston is propelled forward by the main spring, substantially as described.

30. In an automatic firearm, the combination with a main spring and a reciprocating motor piston, of means for imposing a resistance to the movement of said piston whereby its speed may be decreased, said means comprising an escapement wheel, a vibrating arm attached thereto, and a weight carried by said arm, with mechanism operated by said motor piston for moving said escapement wheel, substantially as described.

31. In an automatic firearm, the combination with a main spring and a reciprocating motor piston, of means for imposing a resistance to the movement of said piston whereby its speed may be decreased, said means comprising an escapement wheel, a vibrating arm attached thereto, and a weight carried by said arm, with mechanism operated by said motor piston on its forward stroke for rotating said wheel, substantially as described.

32. In an automatic firearm, the combination with a main spring and a reciprocating motor piston, of means for imposing an adjustable resistance to the movement of said piston whereby its speed may be decreased, said means comprising an escapement wheel, a vibrating arm attached thereto, and a weight adjustably mounted on said arm, with mechanism operated by said motor piston on its forward stroke for rotating said wheel, substantially as described.

33. In an automatic firearm, the combination with a main spring and a reciprocating motor piston, of means operable on the forward movement of said piston for imposing a resistance to the movement of said piston whereby its speed may be decreased, said means comprising cam grooves on the interior of the rear end of said motor piston, a rod having ribs engaging said cam grooves as said piston recoils, an escapement wheel connected to said rod, and a weighted arm coöperating with said wheel, substantially as described.

34. In an automatic firearm, the combination with a main spring and a reciprocating motor piston, of means operable on the forward movement of said piston for imposing a resistance to the movement of said piston whereby its speed may be decreased, said means comprising cam grooves on the interior of the rear end of said motor piston, a rod having ribs engaging said cam grooves as said piston recoils, an escapement wheel driven by said rod and free to rotate on the rearward travel of said piston, but retarding the revolution of said rod on the return movement of said piston, and a vibrating arm connected to said escapement wheel, with a weight carried thereby, substantially as described.

35. In an automatic firearm, the combination with a main spring and a reciprocating motor piston, of means operable on the forward movement of said piston for imposing a resistance to the movement of said piston whereby its speed may be decreased, said means comprising cam grooves on the interior of the rear end of said motor piston, a rod having ribs engaging said cam grooves as said piston recoils, an escapement wheel driven by said rod and free to rotate on the rearward travel of said piston, but retarding the revolution of said rod on the return movement of said piston, and a vibrating arm connected to said escapement wheel, with a weight carried thereby and adjustably mounted thereon, substantially as described.

36. In an automatic firearm, the combination with a motor piston and a main spring for returning said motor piston to the initial position, of means for varying the compression on said main spring, said means comprising a screw-threaded rod projecting into the rear coils of said main spring, a nut mounted on said rod but held against turning thereon, and engaging the rear end of said main spring, and means for turning said rod and thereby adjusting the compression of said main spring, substantially as described.

37. In a magazine firearm, the combination with the receiver and the shoulder piece, of pins for securing the same together, each provided with an annular groove near one end thereof, and a rotary safety bolt mounted at right angles to said pins and adapted to normally project into said annular grooves, and to lock said pins in place, but being provided with notches to permit the release of said pins when said bolt is turned to a certain position, substantially as described.

38. In a magazine firearm, the combination with the receiver and the shoulder piece, of pins for securing the same together, each provided with an annular groove near one end thereof, and a rotary safety bolt mounted at right angles to said pins and adapted to normally project into said annular grooves, and to lock said pins in place, but being provided with notches to permit the release of said pins when said bolt is turned to a certain position, the said safety bolt being also provided with a shoulder to engage a corresponding projection on the shoulder piece and to lock the safety bolt against accidental displacement, substantially as described.

39. In a gas operated gun, means for controlling the escape of the powder gases from the cup-shaped forward end of the motor piston, comprising a guard surrounding the motor piston and gas inlet, with perforations in the forward portion of said guard, and an annular baffle plate surrounding the gas inlet, but spaced away therefrom, substantially as described.

WILLIAM HORACE SQUIRE.
HENRI ALBERT MERCIÉ.